Figure 1:
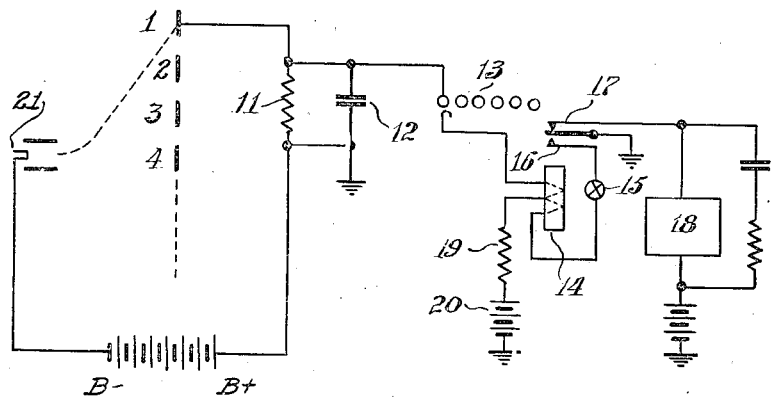

Jan. 18, 1944.    G. DEAKIN ET AL    2,339,684
ELECTRONIC CONTROL FOR TELECOMMUNICATION SELECTOR SWITCHES
Filed June 28, 1941

INVENTORS
GERALD DEAKIN
TREVOR H. CLARK.
BY
ATTORNEY

Patented Jan. 18, 1944

2,339,684

UNITED STATES PATENT OFFICE 2,339,684

ELECTRONIC CONTROL FOR TELECOMMUNICATION SELECTOR SWITCHES

Gerald Deakin, New York, and Trevor H. Clark, Great River, N. Y., assignors to International Standard Electric Corporation, New York, N. Y., a corporation of Delaware Application June 28, 1941, Serial No. 400,244
In France June 1, 1940

9 Claims. (Cl. 179—18)

The present invention refers to electronic discharge device control circuits for telephone or similar systems and more particularly to control circuits for positioning selector switches in automatic telecommunication exchange systems and the like under the control of electronic discharge devices.

It is usual practice to position selector switches under the control of marking equipment which has previously been set by dial pulses or by other means.

The selector switches are multiposition switches having for instance 10 to 200 possible positions and usually are of the single motion progressive type which advance successively through their several possible positions either by a step-by-step action or by a power drive. Progressive single motion selector switches have at least one test wiper which successively makes contact with the successive terminals of a test series of terminals as the switch advances through its successive positions. Two or more further wipers (which may or may not wipe continuously over their cooperating terminals during the advance of the switch) are provided to make contact with the appropriate terminals of two or more cooperating series of terminals when the switch is brought to rest in the desired position.

To control the positioning of the selector switch the marking equipment is ordinarily arranged to apply ground or battery potential to that one of the test terminals of the selector switch which corresponds to the desired position of the selector switch. Then an electromagnetic test relay is provided which is connected to the test wiper of the selector switch. This test relay is arranged to be energized by the ground or battery potential on the marked test terminal when the test wiper reaches this terminal. The relay then acts to stop the advance of the selector switch.

In the past the marking equipment which marks the selected test terminal with ground or battery potential has usually consisted of a relay counting chain or else of an eleven-position step-by-step rotary switch which may have one single wiper and one cooperating bank of terminals. Such counting chain or step-by-step switch was set to its desired position under control of a subscriber's dial or under control of a so-called register-sender equipment or of an operator's keyset or by the operation of the line relay of a calling line or by some other means, and served to mark the desired test terminal of the selector switch, which was then advanced to the position corresponding to such marked test terminal as above explained. Instead of a relay counting chain or step-by-step switch it may be desirable to use electronic marking means such as a counting-chain of glow lamps or a cathode ray tube whose ray can be deflected to strike any one of a number of anodes. Suitable glow lamp counting chains are well known; and suitable cathode ray tubes with the circuits therefor are shown in French Patents Nos. 857,806, and 859,752.

When any such electronic marking means are used the currents delivered to the marked test terminal are inconveniently small so that it is necessary to use for the test relay which stops the advance of the selector switch a delicate and expensive relay of unusual sensitivity or else to insert an electronic amplifier ahead of the relay.

It is an object of the present invention to make use of electronic marking equipment while obviating these disadvantages.

It is another object to provide an arrangement whereby a selector switch, preferably a progressive single motion switch, which is of a type normally controlled by a current of more than one milliampere, e. g., by operation of a stopping relay or of an electromagnet, can be positioned under the control of weak marking currents of the order of microamperes (i. e., more than one microampere and less than one milliampere) without the use of electron discharge amplifier equipment.

More particularly it is an object to provide a circuit arrangement for stopping a progressive switch provided with a test wiper advancing over a series of test contacts, one of which is marked by a weak current from an electronic marking equipment by operating an electromagnetic relay directly from the energy supplied by said weak current.

Briefly, the invention makes use of one condenser per marking wire for slowly storing energy from the weak marking current and delivering such energy sufficiently rapidly to operate an ordinary relay. With some types of cathode ray tubes the complete opening of the circuit of the selected anode by insertion of a condenser might cause the ray to disperse itself onto adjacent anodes thus marking undesired ones of the marking wires, while with glow tube counting chains such complete opening of the circuit might extinguish the tube. Also, there is the possibility that condensers not intended to be charged might retain charges from a previous operation or might acquire such charges due to unavoidable stray electrons if there were no galvanic connection thereto. Preferably, therefore, each condenser is provided with a high resistance leak for the purpose of insuring that the condensers of unmarked wires are fully discharged and for the purpose of allowing some current to continue to flow through the selected space path of the marking equipment.

The invention may be practiced with any type of electronic marking equipment which is adapted to deliver a weak current to a desired one of a series of conductors. Preferably, the invention is practiced with a marking equipment principally consisting of a multi-anode cathode ray tube whose ray may be set under the control of dial pulses or other means to strike any selected one of the anodes. Such tubes seldom deliver more than 100 microamperes of marking current. In the description of the invention given hereafter it will be assumed for convenience that such a cathode ray tube is used as the marking means and that the selector switch to be positioned is a single motion progressive switch driven by clutching to a constantly rotating drive shaft.

According to the preferred form of the invention, each output electrode or target of the cathode ray marking device is connected to a resistance to whose terminals is connected a capacity in shunt. One of the terminals of each capacity is grounded or connected to any other fixed potential and the other is connected to a contact of a test bank of the selector switch whose cooperating wiper is connected to the winding of a relay which serves as a stopping relay for the selector switch. When the selector switch in its advance establishes the connection between the contact of the condenser charged by the cathode beam on the marking switch and a winding of said relay, the latter is energized under the action of the discharge of the condenser which had been charged by the electronic beam and the operation of such relay is arranged to stop the selector switch. As many condensers are provided as there are marking conductors from the cathode ray marking device. After its operation the relay locks via a normally closed circuit breaker which is arranged to open for releasing the relay at some suitable time thereafter, e. g., when it is desired to restart the selector switch for positioning it on another marked terminal.

The invention will be explained more in detail in the following description of two embodiment examples schematically shown in Figs. 1 and 2 of the accompanying drawing.

In both figures of the drawing, reference numerals 1, 2, 3, 4 designate the output electrodes or anodes of an electronic switch, whose cathode 21 emits electrons which are formed into a ray and arrive at the desired anode by means not shown, arranged to serve as a marker in an automatic telecommunication exchange system. This electronic switch can have any desired number of output electrodes, for example, 10 or 12 if used to replace a conventional telephone exchange marking switch. To each of these electrodes is connected a resistance such as shown at 11 for electrode 1. The value of this resistance is so chosen that a potential of suitable value will appear at its terminals when the electronic beam falls on the target with which it is associated. Ordinarily, it is preferable to make this resistance roughly of the same order of magnitude as the D. C. resistance of the cathode ray tube, i. e., more than one-tenth and less than ten times the D. C. resistance of the ray tube. In shunt to each resistance 11 is a condenser 12 of such capacity that the amount of electricity it stores, when resistance 11 develops a voltage at its terminals due to the passage of the electronic beam, suffices to operate relay 14 which deenergizes clutch magnet 18 of the selector switch 13, 18.

Relay 14 is shown in Fig. 1 as consisting of a relay with two windings in parallel having a common connection to a battery 20 connected to ground in series with a resistance 19. One of these windings is connected to the wiper of selector switch 13, 18 whose clutch magnet 18 is shown in the conventional manner shunted by a resistance in series with a capacity. This selector switch for the purposes of explanation is assumed to be a so-called "sequence" switch, a device long known in the telephone art. Such a switch is disclosed in the patent to Reynolds et al., No. 1,127,808, issued February 9, 1915. The wiper just mentioned is displaced on the bank 13 of the selector switch. The circuit for the other winding of relay 14 passes through a normally closed circuit breaker 15 and a front contact 16 of the relay whose armature is grounded. Back contact 17 cooperating with this armature is connected in the energizing circuit of clutch magnet 18 and keeps this circuit normally closed to ground so that the switch 13, 18 rotates continuously under normal conditions.

It will be noticed that the positive terminal (B+) of the plate supply of the electronic switching device is at the ground potential, as is also one side of condenser 12. The negative terminal (B—) is connected to the cathode 21 of the cathode ray tube.

It is more desirable, though not necessary, that the potential developed at the upper terminal of condenser 12 be in polarity opposition to the potential at the ungrounded terminal of battery 20.

Assuming now that a potential has been applied to resistance 11 hence that condenser 12 has been charged, when selector switch 13, 18 arrives at terminal 13 marked by condenser 12, the upper winding of relay 14 is traversed by current, relay 14 is energized and attracts its armature on contact 16, consequently opening the circuit of clutch magnet 18 at contact 17. The selector switch stops and remains stopped because the armature is kept attracted on contact 16 by the passage of current in the second winding of the relay, after condenser 12 is discharged, as long as breaker 15 is closed. When the selector switch has completed its function (e. g., at the end of a call) breaker 15 is opened by any suitable means and the armature returns to contact 17, the circuit of clutch magnet 18 is again closed and the selector switch will resume its hunting.

It will be seen that if all the factors have been suitably chosen, the selector switch can be stopped by a very weak current across resistance 11.

Figure 2:
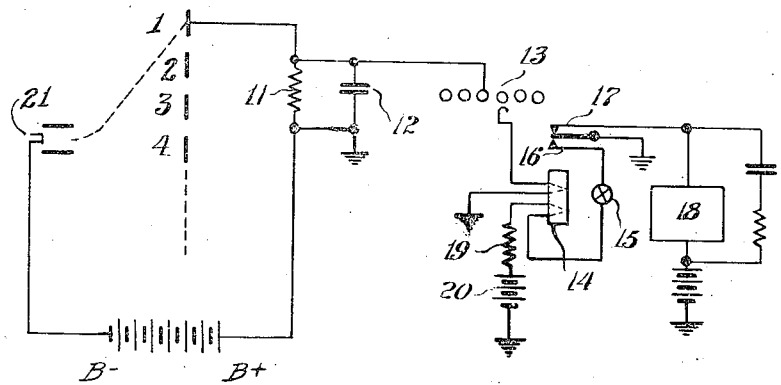

Fig. 2 shows a circuit whose operation is similar to that of Fig. 1 but in which the circuits through the two windings of relay 14 are independent of each other, which ensures in certain cases a less critical operation than for the circuit of Fig. 1. The currents and the windings should be in proper inductive relation in order to aid and not hinder the operation of the system.

It is also possible to employ only one winding for the relay, with a locking circuit passing, in known manner, through a contact of said relay.

It will be seen that in accordance with the present inventoin, the amplifier and its usual circuits which would otherwise be required to enable the weak marking current to operate a relay can be replaced with one set of condensers equal in number to the number of positions of the marking switch.

In the above description of Figs. 1 and 2 the breaker 15 has been assumed to be normally closed, being momentarily opened to release relay 14 when it is desired to start the selector switch hunting. The breaker 15 is merely a schematic representation of contact means to be provided on a suitable relay or relays of the associated exchange circuits. Such contact means may be a single contact on a relay which is momentarily operated at the time the selector switch is taken into use or may comprise two or more series or parallel connected contacts on separate relays. Thus, if the selector switch is a first selector of an ordinary automatic telephone exchange, the breaker 15 may consist of a back contact on the usual selector-holding relay (which is usually arranged to operate when the link including this selector switch is taken into use and to remain operated till the connection is released) connected in parallel with a front contact on an additional relay (which may be arranged to be operated by the selector-holding relay). This would normally hold relay 14 so that the selector would stand still until the link was taken into use. Alternatively, the contact means represented by breaker 15 may comprise a front contact of the selector-holding relay connected in parallel with a back contact of some relay which operates after the operation and releases after the release of such holding relay. This would produce a momentary opening to release relay 14 when the link was released at the end of conversation, so that the selector switch would start rotating at the end of each call and would continue rotating until stopped by a marking current in the position selected for the next call.

In general, the circuits for stopping the switch by operation of the test relay 14 and for restarting the switch when desired, may be arranged in any manner usual for known types of exchange systems, except that ordinarily some provision should be made for locking test relay 14 in view of the fact that the test relay receives only a momentary surge of operating current from the condenser. Also, this relay must be unlocked at some time before it is needed to again control the stopping of the selector switch. If the system to which the invention is applied is such that the switch is maintained at rest only by operation of the test relay, then the test relay 14 must be held until it is desired to restart the switch. If, on the other hand, the system is one wherein the circuit for driving the selector switch is opened by the test relay and then at some later point in the operations is further opened by other contacts, it will be suitable to release relay 14 at any time after such later point. Thus it will be seen that the exact arrangement of the contacts schematically represented by breaker 15 and/or of other contacts which may be provided in series with clutch 18, will depend upon the type of automatic exchange system to which the present invention is applied, suitable connections for any given type of system being obvious to any one skilled in automatic exchange circuit design.

For convenience it has been assumed heretofore that the selector switch itself carries the test wiper which makes contact with successive ones of the terminals 13. In some known types of systems, however, it is the practice to provide the test wiper and test terminals which are marked by the marking equipment in the form of a separate control switch (or counting chain) of progressive type which advances in synchronism with the selector switch to be positioned. In applying the present invention to such systems the same practice may be followed.

In the embodiment described the lower terminal of condenser 12 is grounded, i. e., connected to B+, so that the condenser is charged by the cathode ray to store energy and then is discharged through relay 14 to operate the latter. The leak resistance 11 serves in this case to discharge the condenser 12. If desired, however, the lower terminal of condenser could be connected to any other point of fixed potential, such as to B—. The other connections could remain unchanged, leak 11 being still grounded, and the operation of this system would be essentially unaltered except for the fact that the gradual flow of current through the condenser via the cathode ray would, strictly speaking, constitute a discharging of the condenser while the more rapid flow of current through the condenser via relay 14 would constitute a charging of the condenser. In view of the fact that the alteration of the charge rather than the absolute states of charge are of primary interest, expressions such as "relatively charging" and "relatively discharging" will be used hereinafter to denote any changes of the charge from the normal state to an abnormal state and vice versa respectively, regardless of whether the condenser is thereby brought from a charged condition to an uncharged condition or from an uncharged condition to a charged condition, or from a charged condition to another charged condition of opposite polarity or different intensity.

We claim:

1. A circuit arrangement for automatic telecommunication exchange systems and the like, which comprises a multiposition mechanical selector switch, a number of marking conductors each connected to an individual stationary contact of said switch, a constantly rotating wiper cooperating therewith, electronic marking means for delivering a current to any desired one of said conductors, an electromagnetic relay designed to be operated by a current greater than said current delivered by said electronic marking means connected to said wiper, a number of condensers each connected to be relatively charged over one of said conductors in response to the delivery of current to such conductor by said electronic marking means, the capacity value of each of said condensers being sufficient for storing enough energy to operate said relay, and means for positioning said switch under control of the operation of said relay.

2. A circuit arrangement for automatic telecommunication exchange systems and the like, which comprises a sequence switch, a plurality of stationary contacts therefor, a rotary wiper cooperating with said contacts, a number of marking conductors connected respectively to individual ones of said contacts, electronic marking means for delivering a current to any desired one of said conductors, an electromagnetic relay in circuit with said wiper designed to be operated by a current greater than said current delivered by said electronic marking means, a number of condensers each connected to be relatively charged over one of said conductors in response to the delivery of current to such conductor by said electronic marking means, the capacity value of each of said condensers being sufficient to operate said relay, driving means for advancing said wiper over said contacts, and means for stopping the advance of said switch under control of the operation of said relay.

3. A circuit arrangement as claimed in claim 2 further comprising a number of leak resistances each connected to one of said condensers for relatively discharging said condensers.

4. A circuit arrangement as claimed in claim 2 further comprising a number of leak resistances each connected to one of said condensers for relatively discharging said condensers, each of said resistances being roughly of the same order of magnitude as the direct current resistance of said electronic marking means.

5. A circuit arrangement as claimed in claim 2 further comprising locking means for holding said relay actuated in response to actuation thereof, and means for releasing said relay after said switch has been stopped.

6. A circuit arrangement according to claim 2 wherein said electronic marking means comprises a cathode ray tube having a cathode and a number of anodes respectively connected to said number of conductors, and means for directing a cathode ray from said cathode to a desired one of said anodes.

7. For positioning a multiposition mechanical selector switch under the control of electronic marking equipment of the type which delivers a current to any of a number of conductors, a circuit arrangement which comprises an electromagnetic relay designed to be operated by a current greater than said current delivered by said electronic marking equipment, a number of condensers each connected to be relatively charged over one of said conductors in response to the delivery of current to such conductor by said electronic equipment, the capacity value of each of said condensers being sufficient for storing enough energy to operate said relay, contact means for connecting said relay successively to said condensers, and means for positioning said switch under control of the operation of said relay.

8. For positioning a multiposition mechanical selector switch under the control of electronic marking equipment of the type which delivers a current to any of a number of conductors, a circuit arrangement which comprises an electromagnetic relay designed to be operated by a current greater than said current delivered by said electronic marking equipment, a number of condensers each connected to be relatively charged over one of said conductors in response to the delivery of current to such conductor by said electronic equipment, the capacity value of each of said condensers being sufficient for storing enough energy to operate said relay, driving means for advancing said switch successively through different positions, contact means synchronized with said switch for connecting said relay successively to said condensers in synchronism with the passage of said switch through its successive positions, and means for stopping the advance of said switch under control of the operation of said relay.

9. An arrangement for positioning a multiposition mechanical switch under control of an electronic marking device which comprises at least one condenser, means for relatively charging said condenser by the current from said device, an apparatus requiring a substantial current for its operation, means for discharging the condenser through said apparatus to operate it, and means for positioning said mechanical switch under control of said apparatus.

GERALD DEAKIN.
TREVOR H. CLARK.